United States Patent [19]

Hubert

[11] Patent Number: 5,493,611
[45] Date of Patent: Feb. 20, 1996

[54] USER CONFIGURABLE TELEPHONE WITH ALARM FEATURE

[75] Inventor: Donnette E. Hubert, Cedar Knolls, N.J.

[73] Assignee: AT&T Corp., Murray Hill, N.J.

[21] Appl. No.: 247,157

[22] Filed: May 20, 1994

[51] Int. Cl.⁶ .................................................. H04M 11/00
[52] U.S. Cl. ........................... 379/387; 379/252; 379/67; 379/68
[58] Field of Search ................................ 379/387, 179, 379/251, 252, 67, 68, 69, 147, 49, 142

[56] References Cited

U.S. PATENT DOCUMENTS

| | | | |
|---|---|---|---|
| 3,595,999 | 7/1971 | Cole | 379/69 |
| 3,865,985 | 2/1975 | Stankus | 379/49 |
| 4,481,382 | 11/1984 | Villa-Real | 379/61 |
| 4,847,818 | 7/1989 | Olsen | 368/10 |
| 4,995,075 | 2/1991 | Angiolillo-Bent et al. | 379/142 |
| 5,048,080 | 9/1991 | Bell et al. | 379/387 |
| 5,317,545 | 5/1994 | Gray et al. | 379/114 |
| 5,317,626 | 5/1994 | Jaynes et al. | 379/68 |

Primary Examiner—Jeffery A. Hofsass
Assistant Examiner—Jacques M. Saint-Surin
Attorney, Agent, or Firm—Samuel R. Williamson

[57] ABSTRACT

A user configurable telephone station receives telephone calls in a normal manner and also provides a user settable alarm for alerting a user at prescribed times. At each prescribed time, an alerting signal is provided by actuating the telephone ringer either with a distinctive ring or a normal ring, such configuration being selectable by the user. The telephone station optionally also includes a recorder with which the user may record a spoken announcements for associating with the alerting signal. When the switch-hook in the telephone station is actuated in response to the alerting signal, any associated, recorded announcements is played through an acoustic device, such as a speaker, in the telephone station.

16 Claims, 2 Drawing Sheets

USER CONFIGURABLE TELEPHONE WITH ALARM FEATURE

BACKGROUND OF THE INVENTION

1. Technical Field

This invention relates to telephones and, more particularly, to telephones having programmable alerting features.

2. Description of the Prior Art

More than ever in today's hectic and fast paced society, people have a need to adhere to very busy schedules. Many demands am made on people to do certain things at specific times. The office manager, for example, has an appointment calendar in which he or she records meetings or other appointments and then periodically reviews such calendar in order to adhere to these scheduled events.

A person in his or her home has schedules that must be adhered to as well. Such schedule starts with waking up at a certain time in order to go about achieving the day's scheduled activities. Such activities am varied and numerous. The need to go places at certain times, to make telephone calls, even to make and schedule other events at specific times is necessary, just to name a few.

Although a calendar serves to remind a person of his or her scheduled activities, once these activities am entered, such calendar is of no use if the person fails to remember to look at it. Thus some more active way of reminding a person of his or her scheduled activities is desired.

SUMMARY OF THE INVENTION

The above problem is solved through use of a user configurable telephone which provides an alerting signal to a user or anyone who is within the signaling range of the telephone.

In accordance with one aspect of the invention, the telephone provides a user settable audible alarm for alerting the user at a prescribed time. This alerting signal to the user is provided by actuating the telephone ringer either with a distinctive ring or a normal ring, such configuration being determined by the user.

In accordance with another aspect of the invention, the configurable telephone includes a recorder with which the user may record a spoken announcement for associating with the alerting signal. When the switch-hook in the telephone is closed for example, by the user lifting the handset in response to the alerting signal, the recorded announcement is played through the telephone's acoustic device such as a speaker.

BRIEF DESCRIPTION OF THE DRAWING

This invention and its mode of operation will be more clearly understood from the following detailed description when read with the appended drawing in which.

Throughout the drawings, the same elements when shown in more than one figure are designated by the same reference numerals.

DETAILED DESCRIPTION

Figure 1:
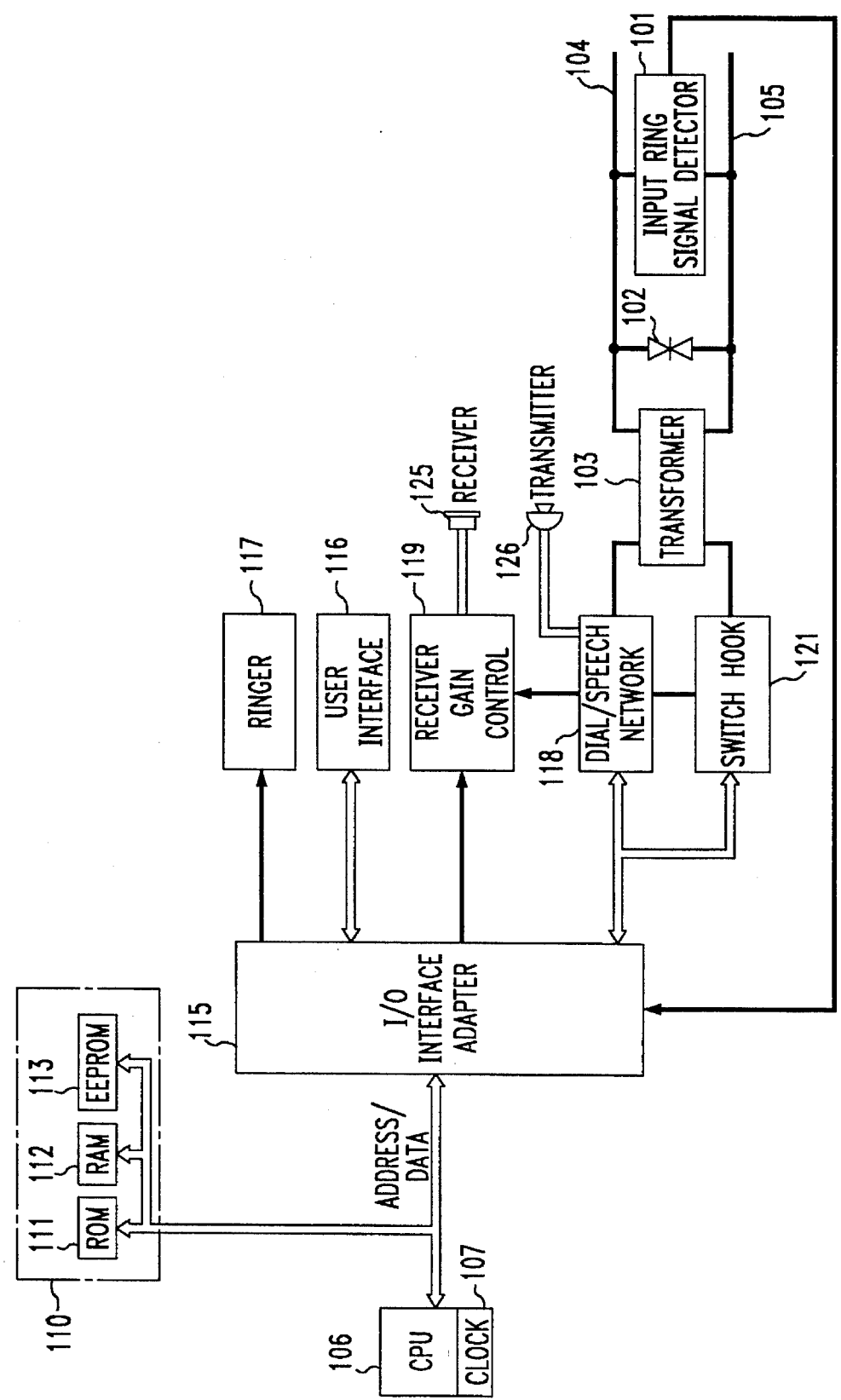
FIG. 1 shows a block diagram of the major functional components of a telephone station.

With reference to FIG. 1 of the drawing, there is shown a simplified block diagram of a telephone station for incorporating the present invention. One example of a telephone station that can perform the required functions of the invention, once the coding and circuitry disclosed herein are incorporated, is the AT&T SMART PHONE Model 2100. This phone is briefly described in an article in *Discover Magazine* entitled "Calling The Future," by David J. Fishman, page 22, February 1992.

As shown in FIG. 1, the telephone station includes an input ring signal detector 101, a varistor 102 and a transformer 103 which, other than the signal detector 101, show a typical connection between the telephone station and the tip and ring terminals 104, 105 of a telephone line. Circuitry usable for providing the functions of the detector 101 is disclosed in U.S. Pat. No. 4,567,333 which issued to D. M. Embree et al. on Jan. 28, 1986. The telephone line connects the telephone station into the telephone communication system through a telephone central office (not shown). Typical switching offices are either shown or described in U.S. Pat. No. 4,277,649 which issued to D. Sheinbein on Jul. 7, 1981.

The numerous features and functions of the telephone station are controlled by a central processing unit (CPU) 106. CPUs are commercially available. A CPU commercially available from Intel Corporation as Part No. 80C31 can be used for CPU 106 with the proper programming. The telephone station also includes a memory section 110 which interfaces with and stores data for proper operation of the CPU 106. This memory section comprises read only memory (ROM) 111, random access memory (RAM) 112 and electrical erasable programmable read only memory (EEPROM) 113. As an alternative to EEPROM, the memory section 110 also may have the RAM in this section backed up with a battery contained in the telephone station. The memory section 112 advantageously employs audio grade RAM. In accordance with the disclosed embodiment, this RAM contains data representative of recorded announcements which are played to a user of the telephone station at prescribed times, this operation being described in greater detail later herein and with reference to both FIGS. 2 and 3.

Connected to the CPU 106 and the memory section 110 is a peripheral input/output interface adapter 115 which includes interface circuitry and multiple ports for interfacing the CPU 106 with other circuitry in the telephone station. A user interface circuit 116 is connected into the telephone station via the adapter 115. Such an interface circuit is designed for ease of use, consistency and simplicity. This user interface circuit 115 includes, by way of illustrative example, a fiat screen display element (not shown) and a touch-sensitive element (also not shown). The display element provides button images, prompts, status and other text while the touch-sensitive element provides the means for user inputs.

A simulated keyboard as well as a simulated dial keypad can be displayed on the display element in the interface circuit 116 and in response to the touching of simulated function keys or buttons, generate appropriate control signals. The fiat screen display also can be used to display telephone station output information that is either the result of received information such as the telephone number of a calling party, the result of information requests, such as those directed to setting an alarm and recording a spoken announcement or a combination of both the received and stored information. The access features of the user interface circuit are implementable in a straight forward manner in view of the known art. An interface device suitable for use as user interface 116, for example, is described in U.S. Pat. No. 4,725,694 which issued to C. M. Auer et al. on Feb. 16, 1988.

Other circuitry in the telephone station includes a finger 117, a dial/speech network 118, a receiver gain control 119 and an electronic switch-hook 121. The finger 117 is activated whenever the input ring signal detector 101 senses a tinging signal on line 104,105 and also, in accordance with the disclosed embodiment, whenever a prescribed time determined by a user settable alarm in the telephone station is arrived at. Distinctive tinging in the telephone station may be achieved in accordance with the teaching of U.S. Pat. No. 4,995,075 which issued to Joel S. Angiolillo-Bent et al. on Feb. 19, 1991. It is also to be understood that an optical source may be substituted for or provided in addition to the ringer 117 for providing a suitable alerting signal to anyone within the viewing vicinity of the telephone station. The dial/speech network 118 contains a speech hybrid for separating and combining the appropriate received and transmit audible signals and a touch-tone synthesizer for generating tones reflective of the digits entered on the user interface 116.

Certain users of the station may have need for the receiver 125 to operate at some amplification level above the nominal level. The receiver gain control 119 provides this amplification to the received signal by operating at three levels; nominal gain, 6 dB above nominal gain and 12 dB above nominal gain. The receiver gain control is connected to the dial/speech network 118 for receiving the received signal and to the adapter 115 for receiving appropriate control information. Power for operation of the telephone station is provided in a conventional manner through use of local AC line power.

In accordance with the disclosed embodiment, the telephone station is user configurable for providing an alerting signal to a user or anyone who is within the signaling range of the telephone station. The telephone finger provides a useful method for signaling a person in that people tend not to ignore a tinging telephone. For example, a person will generally hear and be able to answer a tinging telephone from a sound sleep. This is not necessarily so with an alarm sounding on an alarm clock. Thus the wake-up call that has become so popular over time continues to be provided by many hotel and motels.

By way of operation, the telephone provides a user settable audible alarm for alerting the user at a prescribed time selected by the user. The user, through the user interface 116, inputs the desired times that the alarm (finger) should be actuated. This alerting signal from the telephone finger 117 may be either with a distinctive ting or a normal ring. The actual configuration is selected by the user. The distinctive ting capability is provided since the user may want to know when the ring being generated is from an alarm that was set rather than from an incoming telephone call. One ringing sequence which provides this desired distinction is achieved by modifying a standard ting pattern which typically consists of a 1.6 second tinging period and a 3.6 second silent or inaudible period. Thus, the modification illustratively would be to reduce the 1.6 second ringing period to a 0.7 second ringing period which is then followed by a 3.6 second silent period. The user is thereby able to recognize that the ting being generated is from the alarm. Other tinging modifications are clearly available.

The telephone station also includes circuitry for providing a recording function for recording messages or spoken announcements to respectively accompany any or each of the alerting signals. Such a recording function is readily provided by a telephone answering system. Telephone answering systems in which messages to oneself, or other members at the same location, may be recorded at the answering system are available. One example of such a system is the digital answering system Model 1343 available from AT&T. In the operation of the herein disclosed embodiment, when the switch-hook in the telephone station is actuated in response to the alerting signal, an accompanying recorded announcement is played through the telephone receiver 125.

Figure 2:
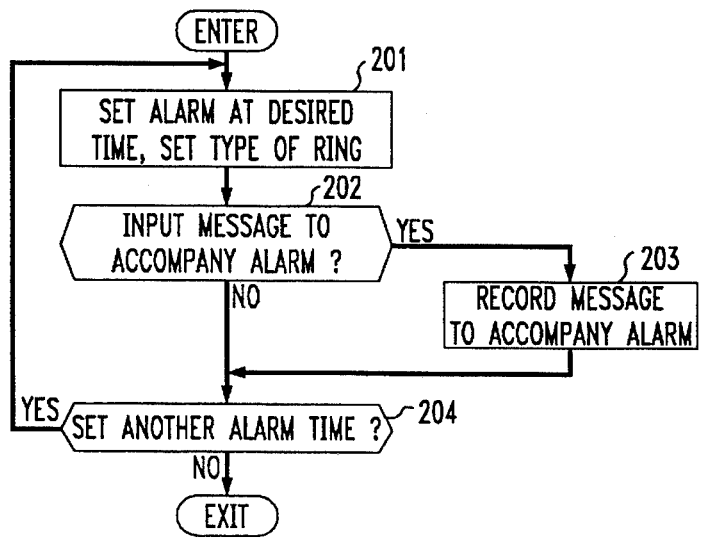
FIGS. 2 and 3 show flow charts of some of the functions performed by the circuitry in FIG. 1 in accordance with the invention.

Referring next to FIG. 2, them is shown a flow chart illustrating the operation of the telephone station in configuring the circuitry therein for operation as a telephone alarm. The functions provided by CPU 106 in executing the operation described in this flow chart are advantageously determined by a process or program stored in memory 110.

The program is entered at step 201 where the user sets the alarm at the desired prescribed time for generating an alarm signal. At this step, the user also sets the type of ring that is to be generated by the ringer for this alarm signal.

From step 201 the process advances to decision 202 wherein the user is prompted by a query which asks if the user desires to provide an input message to accompany the alarm signal. If the user responds yes by depressing the appropriate button on the user interface, the process advances to step 203 where the user is again prompted by appropriate displays on the user interface for how to start recording his or her announcement and also how to stop this recording of the announcement. Once the user has recorded a message in step 203 to accompany the alarm signal, the process advances to decision 204. If in decision 202, the user elects not to record a message, the process advances directly to this decision 204 from decision 202.

At decision 204, the user is queried as to whether another alarm time is to be set in the telephone station. If so, the process returns to step 201 and the information for this alarm time is requested. If another alarm time is not to be set in the telephone station, as indicated by the user, the process is exited.

Figure 3:
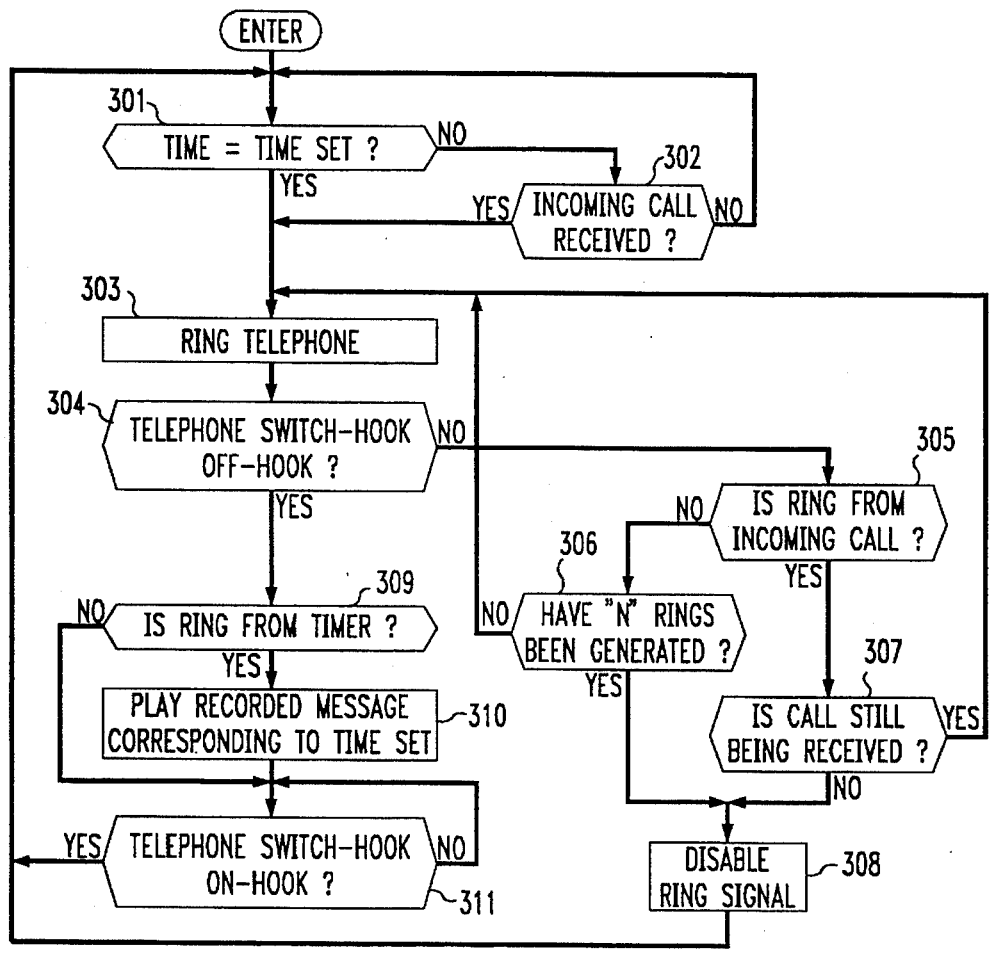

Referring next to FIG. 3, there is shown a flow chart illustrating the operation of the telephone station both as a telephone for receiving calls and also as a telephone alarm. The functions provided by CPU 106 in executing this operation are advantageously determined by a process or program stored in memory 110.

The program is entered at decision 301 where the CPU 106 compares the time set for the alarm with the time of an internal clock 107 (FIG. 1) within the CPU 106. This internal clock 107 provides the time of day and the date over multiple years. Such clocks are available on computers including the Computer System 3333 presently available from AT&T. Thus any short-term scheduled activities that are only minutes or hours away that the user needs to be reminded of may be scheduled. Similarly any long-term scheduled activities or dates that the user needs to be reminded of, even months or years into the future, may be entered via the alarm feature into the telephone station. Such long-term and reoccurring activities or dates would be, for example, birthdays and anniversarys which the user wants to be aware of, but with many other activities continually occupying the user's time, he or she may easily not timely remember these events.

Referring once again to FIG. 3, if in decision 301, the time in clock 301 is not equal to the time set by the user, the process advances to decision 302 where it is determined if an incoming call has been received. If not, the process returns to decision 301 and compares the actual time with the time set through the alarm. The process cycles between decisions 301 and 302 in order to respectively monitor the set alarm times and determine when an incoming telephone call is being received. If at decision 301, the time set is equal to the actual time, or at decision 302, an incoming call has been received, the process advances to step 303 where the ringer 117, shown in FIG. 1, is activated.

From step 303, the process advances to decision 304 where it is determined whether the telephone switch-hook has gone off-hook, i.e., if the handset has been removed from the cradle in the telephone station or, alternatively, in a speakerphone type arrangement, if the speakerphone has been turned on. If the process does not detect an off-hook signal at decision 304, the process advances to decision 305 where the source of the ring is determined and a decision made based on this determination. If the ring is from an incoming call, the process advances to decision 307 where it is determined if the call is still being received. If so, the process returns to step 303.

If at decision 305, it is determined that the ring then being generated is not from an incoming call, i.e., the ring rather is being generated by the alarm signal, the process advances to decision 306 where it is determined if a number ("N") of rings have been generated by the ringer. This number N may be any number selectable by the user who configures the telephone station. A typical number for N is ten rings. If the selected number of rings have not been generated by the ringer, the process returns to step 303.

Once N rings have been detected at decision 306 or that a call is not being received at decision 307, the process advances from either of these decisions to the step 308 where the ring signal is disabled preventing further ringing of the ringer 117. From the step 308, the process returns to the decision 301 which monitors the times set by the alarm.

Referring once again to decision 304, if the telephone switch-hook goes off-hook, indicating that the user has answered the telephone, the process advances to the decision 309. At decision 309, it is determined whether the ring generated was from the timer or from an incoming call. If from the timer, then the process advances to step 310 where, if included in the initial setting of the alarm, a recorded message which corresponds to the time set for the alarm is played to the person answering the telephone.

If at decision 309, it is determined that the ring is not from the timer, i.e., the ring is rather from an incoming call, the process advances directly to the decision 311. From step 310, the process also advances to decision 311. At decision 311, by monitoring the state of the switch-hook, it is determined if the handset is recradled or a speakerphone type telephone is turned off. Once it is determined that the switch-hook is on-hook, the process returns to decision 301 and cycles between this decision and decision 302 for respectively monitoring the set alarm times and determining when an incoming telephone call is being received.

Various other modifications of this invention are contemplated and may obviously be resorted to by those skilled in the an without departing from the spirit and scope of the invention as hereinafter defined by the appended claims.

I claim:

1. A user configurable telephone station for connecting to a telephone line, the station comprising:

timer means for generating a clock signal;

means or generating an alerting signal responsive to an incoming telephone call;

means for providing a user settable alarm for alerting the user at a prescribed time, the generating means providing an alerting signal both upon receipt of an incoming call and at the prescribed time selected by the user settable alarm, said alerting signal including both a first and a second ringing signal, said first ringing signal having a first telephone ring pattern generated in response to the incoming telephone call and said second ringing signal having a second telephone ring pattern generated in response to the timing means advancing to one of the prescribed times set by the user settable alarm, said second telephone ring pattern being distinctive from said first telephone ring pattern; and recording means for recording an announcement to be played to the user in response to the timing means advancing to at least one of the prescribed times set by the user settable alarm.

2. The user configurable telephone station as in claim 1 further including means for associating each of a plurality of said recorded announcements with each of a plurality of user settable alarms for playing an announcement to the user at a prescribed time.

3. The user configurable telephone station as in claim 2 wherein the recorded announcements are played through an acoustic sounder in the telephone station.

4. The user configurable telephone station as in claim 3 wherein the acoustic sounder is a speaker.

5. The user configurable telephone station as in claim 1 wherein said recording means comprises audio grade random access memory.

6. The user configurable telephone station as in claim 3 further including a switch-hook, responsive to the user actuating said switch-hook upon receipt of said second telephone ring pattern, an accompanying recorded announcement is played to said user through the acoustic sounder.

7. A user configurable telephone station for connecting to a telephone line, the station comprising:

timer means for generating a clock signal;

means for generating an alerting signal responsive to an incoming telephone call;

means for providing a user settable alarm for alerting the user at a plurality of prescribed times, the generating means providing an alerting signal both upon receipt of each incoming call and at each prescribed time selected by the user settable alarm, said alerting signal including both a first and a second ringing signal, said first ringing signal having a first telephone ring pattern generated in response to the incoming telephone call and said second ringing signal having a second telephone ring pattern generated in response to the timing means advancing to one of the prescribed times set by the user settable alarm, said second telephone ring pattern being distinctive from said first telephone ring pattern; and recording means for recording each one of a plurality of announcements to be played to the user in response to the timing means advancing to each one of the plurality of prescribed times set by the user settable alarm.

8. The user configurable telephone station as in claim 7 further including means for respectively associating each one of the plurality of announcements with each one of said prescribed times for respectively playing specific announcements to the user at particular prescribed times.

9. The user configurable telephone station as in claim 3 wherein said recording means comprises audio grade random access memory.

10. The user configurable telephone station as in claim 8 further including a switch-hook, responsive to the user actuating said switch-hook upon receipt of said second telephone ring pattern, an accompanying recorded announcement is played to said user through an acoustic sounder in said telephone station.

11. A method of configuring a telephone station comprising the steps of:

generating a clock signal indicative of the time of day;

providing a user settable alarm for alerting the user at a plurality of prescribed times:

generating an alerting signal responsive to an incoming telephone call, the generating step providing an alerting signal at each prescribed time selected by the user settable alarm and upon receipt of each incoming call at the telephone station, said alerting signal including both a first and a second ringing signal, said first ringing signal having a first telephone ring pattern generated in response to the incoming telephone call and said second ringing signal having a second telephone ring pattern generated in response to the clock signal advancing to one of the prescribed times set by the user settable alarm, said second telephone ring pattern being distinctive from said first telephone ring pattern; and recording an announcement to be played to the user in response to the clock signal advancing to at least one of the prescribed times set by the user settable alarm.

12. The method of claim 11 wherein the length of the audible portions of said second telephone ring pattern is one-half of the length of the audible portions in the first telephone ring pattern and the pause between audible portions in the second telephone ring pattern is of equal length to the pause between audible portions in the first telephone ring pattern.

13. The method of claim 11 further including the step of recording each one of a plurality of announcements to be played to the user in response to the clock signal advancing to each one of the plurality of prescribed times set by the user settable alarm.

14. The method of claim 13 further including the step of respectively associating each one of the plurality of announcements with each one of said prescribed times for playing a specific announcement to the user at a particular prescribed time.

15. The method of claim 13 wherein said recording step includes the use of audio grade random access memory.

16. The method of claim 14 further including the steps of actuating by the user a switch-hook in the telephone station upon receipt by said user of said second telephone ring pattern, and, responsive to the actuating step, playing an accompanying recorded announcement to the user through an acoustic sounder in the telephone station.

* * * * *